Patented Dec. 31, 1929

1,741,920

UNITED STATES PATENT OFFICE

THOMAS S. CURTIS, OF HUNTINGTON PARK, CALIFORNIA, ASSIGNOR TO THE VITREFAX COMPANY, OF LOS ANGELES, CALIFORNIA, A CORPORATION

REFRACTORY COMPOSITION AND METHOD OF MAKING

No Drawing. Application filed December 21, 1926. Serial No. 156,254.

This invention relates to improvements in refractory compositions and the art of making the same, and the object in view is the effective and economical synthetic production of an alumina-silica compound having a substantially perfect chemical equilibrium or valence, and especially available for the production of refractories, this application constituting a continuation of my co-pending application Serial No. 94,061, filed March 11, 1926.

It is known that 72% by weight of aluminum oxide fused with 28% by weight of silica produces a compound approaching as nearly as possible a perfect chemical equilibrium of three molecules of alumina to two molecules of silica. This union represents the compound known as mullite, but this compound is rarely found in nature.

Theoretically, it is possible to produce mullite through the fusion of a mixture of aluminum oxide and silica in the proportions named, but, in practice, many difficulties are presented. Under commercial manufacturing conditions not all the molten mass will crystallize into mullite. A portion of it forms corundum crystals, and another portion forms siliceous glass, and in the latter will be found concentrated most of the impurities present in the raw material. As a result, synthetic mullite made from the fusion of alumina and silica usually contains a percentage of corundum crystals and siliceous glass sufficient to seriously lower and in some cases to destroy its refractory properties.

It is the object of the present invention to obviate this difficulty and to lower the cost of production of artificial mullite. I am able to produce at low expense an electrically fused material, a composition, in which the percentage of mullite may be made practically as high as desired.

In carrying out the process in detail, raw materials may be selected from various sources high in aluminum silicate content, such, for example, as the minerals andalusite, kyanite or sillimanite, and the like. It is also possible to use kyanite with its associated pyrophyllite as the source for the alumina and silica. Each of the minerals named affords a source of combined alumina and silica in the proportion of approximately one molecule of alumina to one molecule of silica. Chemical analysis of andalusite or of kyanite or of sillimanite shows a ratio of alumina to silica of approximately sixty-three per cent to thirty-seven per cent by weight. When pyrophyllite is associated with the mineral, the alumina content is somewhat lower while the silica content is somewhat higher than the percentage just named. In order to bring out a finished product in which the alumina bears a ratio to the silica of approximately 72% to 28% by weight, there must be added a supply of alumina in approximately pure form with which to supplement the initial supply of alumina as obtained from the raw material. This supplemental supply of alumina may be effectively provided by the use of aluminum oxide in a fused or crystallized condition. Natural corundum may be employed instead of the aluminum oxide when available in a state of substantial purity, that is, a condition in which the total amount of fluxes, such as iron oxide, titania, magnesia, lime, and alkalies, are less than 2% of the total. Silica in the corundum or fused alumina may be as high as 6% without injurious results.

For raw materials I prefer to use the mineral kyanite since it yields mullite on heat treatment with greater ease than does its companion minerals, sillimanite and andalusite, although either of the latter may be substituted for kyanite without departing from the spirit of this invention. The preferred order is that given, i. e., kyanite, sillimanite, and andalusite, since kyanite breaks down most easily, sillimanite coming next and andalusite breaking down with the greatest difficulty of the three.

With the kyanite, I admix sufficient aluminum oxide to bring the composition of the batch to the theoretical composition of mullite, namely 72 $Al_2O_3$ to 28 $SiO_2$. The aluminum oxide may be in the form of pure alumina such as is made by chemical precipitation from bauxite, or it may be derived from ores rich in alumina such as diaspore, bauxite, roasted and leached alunite, or other sources providing the impurities present are not sufficient in percentage or composition to produce a deleterious effect upon the resultant product.

For certain purposes, such as the manufacture of refractory blocks to form the lining of glass tanks, the presence of potassium oxide and phosphorous pentoxide have been found to be positively beneficial, whereas they exert a highly detrimental effect upon the product if it is to be used as a grain for the manufacture of general refractory ware such as fire brick for boiler linings and the like.

As an example of the application of certain impurities such as potash and phosphorous pentoxide, I may enlarge upon the function they play in the manufacture of glass tank refractories. It is a prerequisite that such refractories shall have a very low porosity or absorption when in contact with a viscous molten liquid such as common glass. Pure mullite grain is exceedingly refractory and when formed into molded shapes, burns with a high natural porosity and with a structure that maintains intercommunicating pore spaces. This is highly undesirable for the reason that such a structure is readily attacked and dissolved by the molten glass owing to the ease with which the fluid glass penetrates the pores.

When the refractory grain is made by my improved process as described herein, which yields a high percentage of mullite crystal in the melt, the composition of the batch may include as much as 3% of $K_2O$ and .25% $P_2O_5$ if the balance of the composition be substantially all alumina and silica, without deleterious effects being noted, providing the product is to be used as a refractory lining to resist glasses or enamels of an essentially alkaline silicate character.

The function of the above mentioned fluxes is to bring about a close, dense, stony structure, remarkably free from intercommunicating pores, when the grain is formed into blocks and fired in the usual manner.

In the manufacture of such a composition, I prefer to use the residue left as a by-product in the recovery of potash from alunite. This residue consists largely of aluminum oxide with a small percentage of silica and usually with from 3 to 4% of potassium oxide, with from .3 to .5% of phosphorous pentoxide among the other impurities. It is a prime essential that the combined lime and magnesia fluxes be less than 1% in the final product, therefore they should be preferably under one per cent in the alunite residue. It will be understood that I use the alunite residue in this case to bring up the total alumina content of the combined kyanite-alumina batch to the ratio of 72—28 as previously described. My preference for alunite residue is merely to take advantage of the potash and phosphorous which commonly are associated with alunite, but any other source of alumina might be utilized, with the potash and phosphorous added as such providing the deleterious impurities be kept within the limits stated, without departing from the spirit of this invention.

To make a mullite grain of great purity, suitable for the manufacture of refractory articles adapted to bear very heavy loads at high temperatures, or to be used as the principal ingredient in refractory wares which must be exceedingly refractory but of high porosity, as distinguished from the preceding case where porosity is undesirable, I use a mixture of kyanite and pure precipitated aluminum oxide such as is used as the raw material in the manufacture of aluminum metal. It is essential that the kyanite be of high purity as regards fluxes, although silica may be present as an associated mineral in quantities up to twenty per cent without exerting any particularly harmful effects but its presence is undesirable and greater yields of mullite will be obtained if the kyanite be concentrated up to a purity of 95% or better. If 95% kyanite be used, and if the total contained or associated impurities be less than one per cent, the mullite yield of this composition will be 92% of the melt, or higher, if the operation is correctly carried out.

Having thus described two of the various combinations that may be made of raw material to bring about special characteristics in the final product, I shall proceed to relate how these mixtures may be converted into mullite. I have not attempted to cover all possible modifications of the fundamental principle of combining kyanite with alumina, but wish to reiterate that the use of a combined silicate such as kyanite makes possible the production of a mullite melt that will be rich in mullite crystals notwithstanding the presence of fluxes which render melts made from sand and alumina or clay and alumina difficult to control with regard to the glass content.

I prefer to grind the kyanite ore or concentrate to a fineness of at least 40 mesh, since at that size, nearly all of the associated gangue or quartz is freed from the kyanite crystals. Furthermore, such fine grinding permits of better mixing with the alumina addition. The latter should also be ground to at least 40 mesh for admixture with the kyanite. Finder grinding of the two is preferable if cost permits. After grinding and mixing to give a composition of $72Al_2O_3$—28 $SiO_2$ in ratio, I prefer to roughly briquet the coarse powder or to agglomerate the powder into small nodules through the addition of a small amount of thin molasses-water after which the nodulized or briquetted charge is dried before charging into the furnace.

The furnace I prefer to use for the conversion is of the conventional open top, pot furnace design, heated electrically by means of current supplied by carbon or graphite electrodes to the pool of molten charge carried within a steel shell. I much prefer to use a three phase furnace for the reason that the refining to be described can be effected more advantageously if the molten bath be kept at a super-heated temperature and be kept free from relatively cool or frozen spots.

In starting the operation, the charge, previously mixed, analyzed, and dried, is fed into the furnace pot until the latter is one-third full. Broken coke is then placed in a triangular pile upon the charge. The electrodes are lowered until contact is established and the arc struck. Immediately, additional charge is fed around the arc to form the banks of a pool of molten charge. As soon as the pool has started to form, the electrodes must be lowered quickly until submerged in the pool, since the resistance of molten mullite composition is so high as to stop the flow of current unless the voltage be abnormally high or the electrodes be immersed in the molten bath. From this starting point on for the first two hours, depends the success or failure of the heat. It is absolutely essential that the formation of a deep pool be accomplished as rapidly as possible at the start as otherwise the power input will fall so low as to make it impossible for a melt of low viscosity to form, and it is upon the fluidity of the bath that I depend for the elimination of iron and ferrosilicon from the melt. If the current input is kept up to peak throughout the heat, the ingot will be found to be substantially free from nodules of reduced ferrosilicon, the metal having sunk through the thin fluid to the bottom of the ingot from which it is readily sorted on cooling and breaking. A further advantage of the high rate of power input and highly liquid bath is the ease with which the unfused crust may be stripped from the ingot owing to the excellent crystallization out to within an inch of the crust resulting in a natural tendency for the crust to come off with the outer half inch or so of semi-fused but poorly crystallized portion of the ingot.

The ingot, resulting from the fusion of a batch of kyanite and alumina will be found to be substantially all mullite crystal from the top of the pool down to within an inch or so of the ferrosilicon button at the bottom. On the other hand, when alumina and sand or alumina and clay are used for the raw batch, it will be found necessary to sort out from one-third to one-half of the total weight owing to imperfect crystallization. There is a tendency for silicon carbide to form at the bottom of the ingot owing to the large percentage of free silica in the batch and the necessity for using a large amount of coke for starting the arc and to form the initial pool. As the melting proceeds, with the sand and alumina batch, the sand melts before the alumina does, and the result is that the bath contains as a starting point, a molten siliceous glass which gradually dissolves and takes into solution the free aluminum oxide in the batch.

When kyanite is used with alumina, the first product to form is mullite since this is the compound that results from the heating of kyanite, the excess silica in the kyanite forming glass. It will be noted, however, that there will be far less glass to react with the free alumina in this case, however, since the first product to form is mullite in the heating of my batch, whereas the first product to form with the sand-alumina mixtures was siliceous glass. In the latter case there is nothing in the melt to create a "seeding" action to promote the growth of additional crystals of like composition. In the case of my batch, the first product to form is mullite, which is the product we aim at as the final one. There is therefore a decided tendency to "seed" the melt with the result that the kyanite alumina ingots yield in regular production approximately ninety per cent of grade A crystal, of low glass content and high mullite content, whereas the sand-alumina ingots seldom yield more than sixty per cent of grade A crystal and this is frequently of high glass content.

Since the cost of the product is proportional to the yield of merchantable product made per ton of raw charge, per kilowatt hour of electrical energy, it is readily seen that the improved method I have described may effect important savings. These savings are in fact as much as forty per cent of the cost of the old method.

Furthermore, the value of the final product is measured in terms of mullite content, the value rising sharply as the glass-corundum constituent lowers and the mullite increases.

The use of a three phase furnace is preferred owing to better distribution of heat and the ease with which a very fluid bath may be maintained. I have not been able to duplicate the results of the three phase furnace with a single phase furnace owing to tendency of bath to partially solidify a short distance from the electrodes.

Having thus described my invention, what I claim as new and desire to secure by Letters Patent of the United States, is:—

1. In the manufacture of refractories, the art of producing mullite comprising melting a mixture of fibrous material of the sillimanite group and alumina.

2. In a process as claimed in claim 1, in which the material of the sillimanite group is of high purity with respect to fluxes.

3. In a process as claimed in claim 1, the step of employing the fibrous material as a concentrate of approximately 95% purity, while maintaining impurities below 1%, the remainder being silica.

4. In a process as claimed in claim 1, the step of briquetting the mixture before melting.

5. In a process as claimed in claim 1, the step of employing as a flux an alkali and phosphorous pentoxide, the former largely predominating over the latter.

6. In a process as claimed in claim 1, the step of employing as a flux an alkaline earth, potassium oxide and phosphorous pentoxide in amounts of approximately 3% of the potassium to 0.25% of tue phosphorous, while maintaining the alkaline earth content under 1%.

7. In a process as claimed in claim 1, the steps of maintaining the fluidity of the bath at such a point that heavy components of the slag will readily sink through the melt and are easily removed.

8. In a process as claimed in claim 1, the steps of feeding the charge into a three phase furnace, covering the same with coke, striking an arc to melt the charge, while feeding additional quantities of charge around the arc to form a bank around the molten portion of the charge, quickly submerging the electrodes in the molten pool of charge, and maintaining the molten charge in a high state of fluidity, to facilitate the separation of impurities.

9. In a process as claimed in claim 1, the steps which comprise fusing the main portion of the charge, and utilizing the fluidity of the melt in stripping the unfused portion or crust from the ingot produced.

10. The process as claimed in claim 1, which comprises utilizing as one constituent, an aluminum silicate in which practically all of the alumina and silica are chemically combined and thereby facilitating the formation of mullite while reducing in the yield the percentage of undesirable glass and corundum adulterant.

11. In the manufacture of refractories, the art of producing mullite comprising melting a mixture of kyanite and preciptated alumina in proportions affording three molecular parts of alumina to two molecular parts of silica for facilitating the formation of a high percentage of mullite.

In testimony whereof I affix my signature.

THOMAS S. CURTIS.

CERTIFICATE OF CORRECTION.

Patent No. 1,741,920.  Granted December 31, 1929, to

THOMAS S. CURTIS.

It is hereby certified that the name of the assignee in the above numbered patent was erroneously written and printed as "The Vitrefax Company", whereas said name should have been written and printed as "The Vitrefrax Company", as shown by the records of assignments in this office; and that the said Letters Patent should be read with this correction therein that the same may conform to the record of the case in the Patent Office.

Signed and sealed this 5th day of August, A. D. 1930.

(Seal)

Wm. A. Kinnan,
Acting Commissioner of Patents.